July 17, 1962 C. B. WICKER 3,044,821
AUTOMOBILE SAFETY BARRIER
Filed Oct. 27, 1959 2 Sheets-Sheet 1
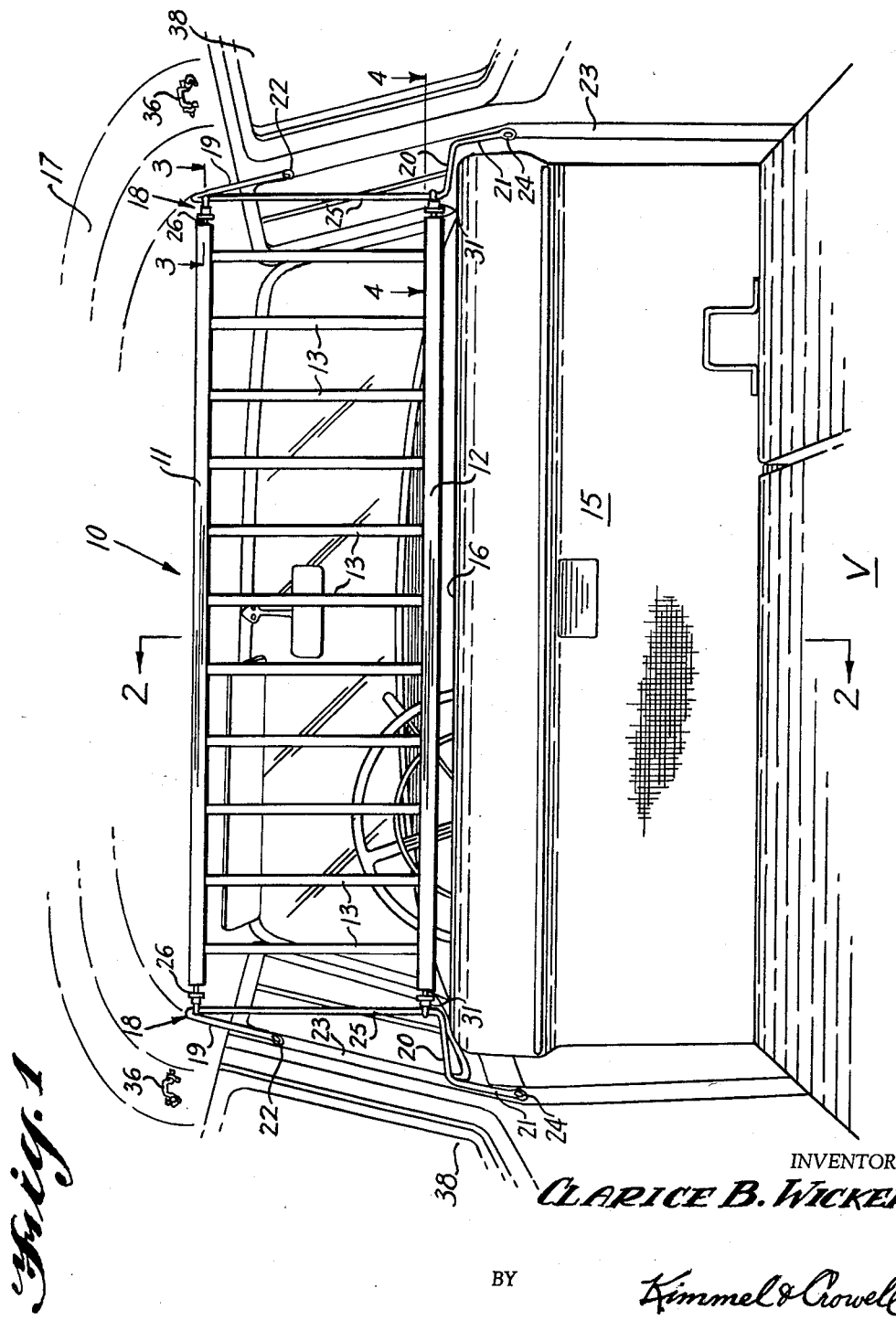
INVENTOR
*CLARICE B. WICKER*
BY *Kimmel & Crowell*
ATTORNEYS July 17, 1962  C. B. WICKER  3,044,821
AUTOMOBILE SAFETY BARRIER
Filed Oct. 27, 1959  2 Sheets-Sheet 2
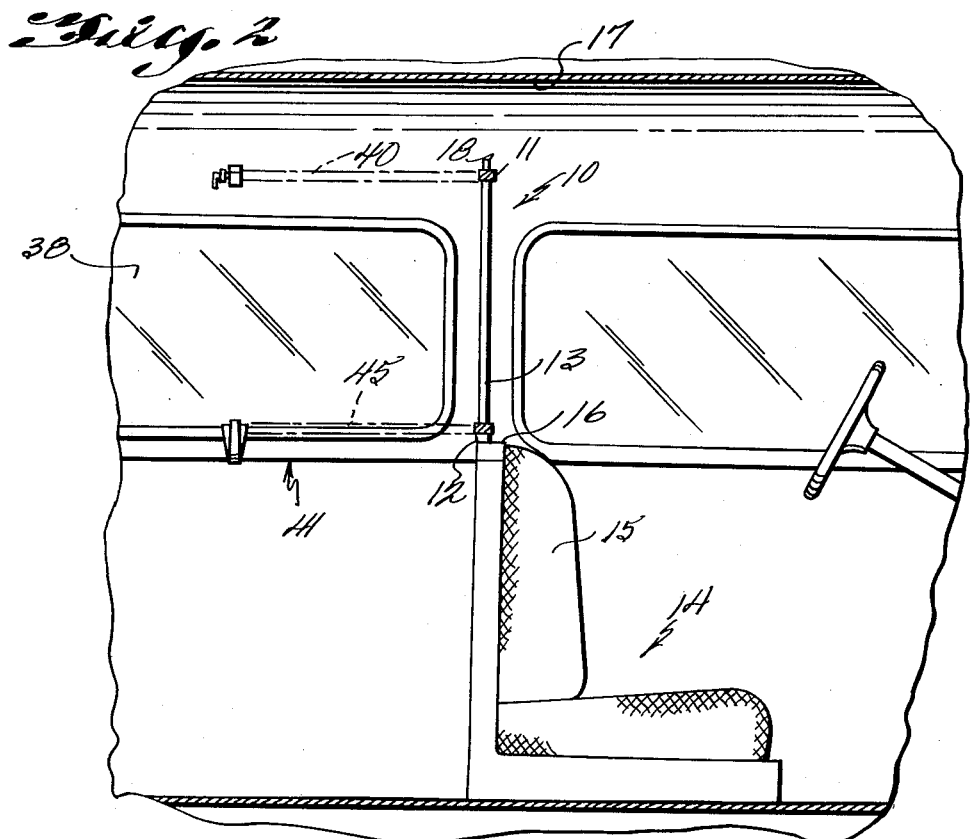
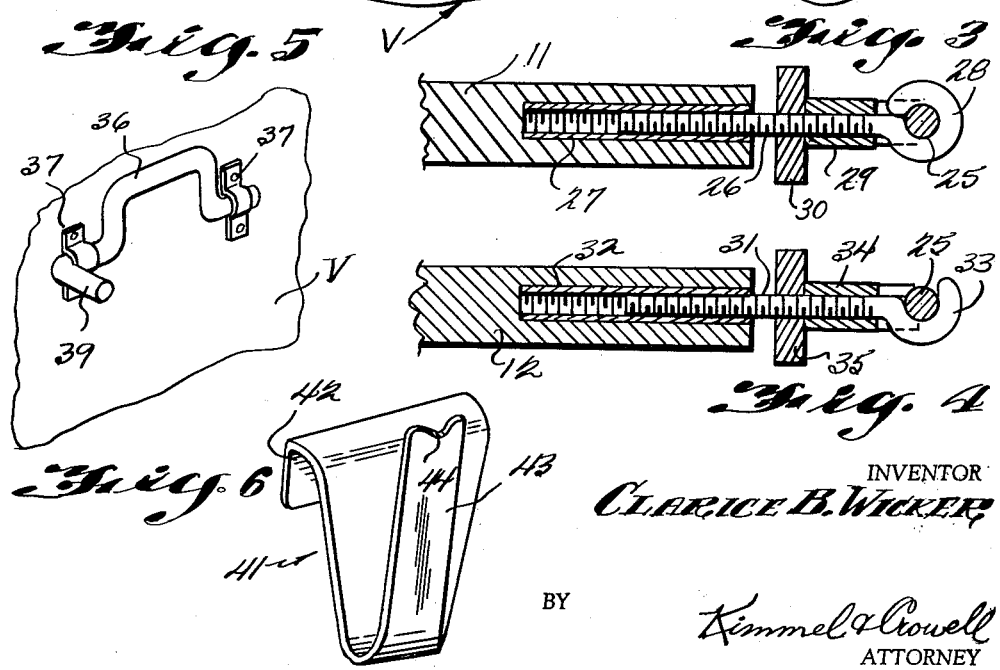
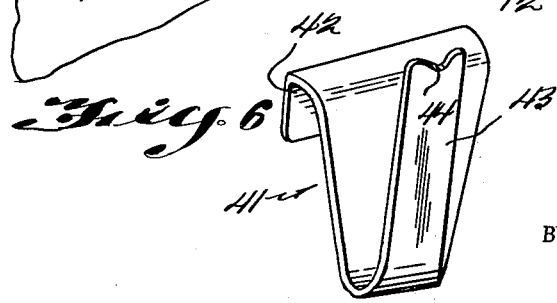
INVENTOR
CLARICE B. WICKER
BY
Kimmel & Crowell
ATTORNEY

United States Patent Office 3,044,821
Patented July 17, 1962

3,044,821
AUTOMOBILE SAFETY BARRIER
Clarice B. Wicker, Burns Hill Drive, Sanford, N.C.
Filed Oct. 27, 1959, Ser. No. 849,040
1 Claim. (Cl. 296—24)

The present invention relates to an automobile safety barrier and particularly to such a barrier positioned between the front and rear seats of the vehicle.

The primary object of the invention is to provide a safety barrier for use above the front seat back of the automobile to keep children out of contact with the driver of the vehicle.

Another object of the invention is to provide a barrier of the class described above which can be supported in an elevated storage position when out of use.

A further object of the invention is to provide a barrier of the class described above which can be mounted in a horizontal position to serve as a support for luncheon trays.

A still further object of the invention is to provide a safety barrier of the class described above which can be readily adjusted to vehicles of different designs and size.

Other objects and advantages will become apparent in the following specification when considered in light of the attached drawings, in which:

FIGURE 1 is a perspective view of the invention shown attached in operative position in a motor vehicle;

FIGURE 2 is a fragmentary vertical section taken along the line 2—2 of FIGURE 1, looking in the direction of the arrows;

FIGURE 3 is an enlarged fragmentary horizontal section taken along the line 3—3 of FIGURE 1, looking in the direction of the arrows;

FIGURE 4 is an enlarged fragmentary horizontal section taken along the line 4—4 of FIGURE 1, looking in the direction of the arrows;

FIGURE 5 is a perspective view of the storage bracket; and

FIGURE 6 is a perspective view of the support bracket.

Referring now to the drawings in detail wherein like reference characters indicate like parts throughout the several figures, the reference numeral 10 indicates generally an automobile safety barrier constructed in accordance with the invention.

The safety barrier 10 includes an upper generally horizontal rail 11, a lower generally horizontal rail 12 arranged in vertically spaced parallel relation thereto and a plurality of spaced parallel vertically extending bars 13 extending between and connecting the rails 11, 12. The rails 11, 12 and the bars 13 may be formed of wood, aluminum or any other desired material.

The barrier 10 is positioned to overlie a motor vehicle seat, generally indicated at 14, and including a back portion 15. The barrier 10 extends from a position slightly above the top edge 16 of the back portion 15 of the vehicle seat to a point spaced below the top 17 of the vehicle, generally indicated at V. A bracket 18 is positioned on each side of the barrier 10 and is provided with a downwardly inclined portion 19 integrally joined to the upper end thereof. The bracket 18 has a horizontal offset lower end portion 20 terminating in a depending portion 21.

Each bracket member 18 has an upper offset end portion 19 for securing to the upper portion of a vehicle and a lower offset end portion 21 for securing to the lower portion of a vehicle on the doorpost 23, for example; the intermediate portions 25 of the brackets 18 are substantially parallel when the brackets are attached to opposite sides of the vehicle and suitable fastening means such as screws 22 and 24 secure the upper and lower ends of the brackets 18 in position.

The barrier 10 is positioned between the brackets 18 and is secured thereto. An eye bolt 26 is threaded into a sleeve 27 in each end of the upper rail 11 and has an eye 28 thereof slidably engaged on the upright portion 25 of the bracket 18. A sleeve 29 is slidably positioned on the eye bolt 26 and is arranged to be clamped against the upright portion 25 of the bracket 18 by means of a thumb nut 30 thereby providing a tight joint between the eye 28 of the eye bolt 26 and the central portion 25 of the upright 18.

A threaded bolt 31 is threaded into a sleeve 32 in each end of the lower rail 12, such bolt having a hook 33 integrally formed on the opposite end thereof opposite the threads of the bolt. The hook 33 and the threaded bolt 31 together provide a hook bolt structure which is adapted to releasably engage the central portion 25 of the bracket 18 and a sliding sleeve 34 is adapted to be clamped against the upright portion 25 of the bracket 18 by a thumb nut 35. The hook bolts 31, 33 and the eye bolts 28, 26 provide for a clamping action by the use of the nuts 35 and 30, respectively, to positively secure the rails in position and the threading of the eye and hook bolts on their corresponding rails provides for controlling the effective length of the rails for cooperation with the parallel portions 25 of the brackets to permit sliding of the eye bolts along the parallel intermediate portions of the brackets.

A U-shaped keeper 36 is pivotally secured to the vehicle V by means of a pair of clips 37 at a point overlying the rear windows 38 of the vehicle V. The keeper 36 has a perpendicularly offset end 39 which maintains the U-shaped keeper 36 against movement below the horizontal, while permitting the U-shaped keeper 36 to fold upwardly to the position illustrated in FIGURE 5 to allow the hook 33 to be swung upwardly past the keeper, the keeper to lower to horizontal position and the hook to move downwardly and be received on the keeper.

The safety barrier 10 is adapted to pivot about the threaded portions of the eye bolts 26 to the dotted line position illustrated at 40 in FIGURE 2 by disconnecting the hooks 33 from the brackets 18 and reconnecting them to the keepers 36.

The thumb nuts 35 and sleeves 34 clamp the hooks 33 to the keepers 36 in the same manner as they clamp to the brackets 18.

A support keeper, generally indicated at 41, has a depending flange 42 arranged to engage in the window 38 at the lower edge thereof. The support 41 has an upstanding integral leg 43 formed thereon and having a notch 44 in its upper end.

The safety barrier 10 can be positioned as illustrated at 45 in broken lines in FIGURE 2 by loosening the thumb nut 30 and sliding the eye 28 downwardly on the bracket 18, after disconnecting the hooks 33. With the safety barrier 10 in a lowered horizontal position, the hooks 33 are engaged over the leg 43 lying in the notch 44. In this position the safety barrier 10 can serve as a support for luncheon trays, as well as serving as a support rack for other articles.

As can be clearly seen from FIGURE 1, the safety barrier 10 will permit the driver of the vehicle to reach through the barrier when required but will, at the same time, prevent children from climbing into the front seat in a manner to disturb the driver.

The eye bolts 26 and threaded bolts 31 are adjustable in the rails 11, 12 so that the effective width of the safety barrier 10 may be varied as required by the motor vehicles with which it is used. Obviously, the bracket 18 may also be constructed in accordance with the design of the motor vehicle with which the barrier 10 is to be used.

Having thus described the preferred embodiments of the invention, it should be understood that numerous structural modifications and adaptations may be resorted to without departing from the scope of the appended claim.

What is claimed is:

A safety barrier device for use in vehicles to prevent undesired movement of persons from one section of the vehicle to another section, said barrier device comprising a pair of bracket members, each bracket member having an upper end portion for securing to the upper portion of a vehicle, and a lower end portion for securing to the lower portion of a vehicle, said upper and lower end portions of said brackets having laterally offset portions so formed as to support said brackets on the vehicle with the intermediate portions of the brackets in substantially parallel relation on opposite sides of the vehicle, means for securing said offset portions of said brackets to the vehicle, a barrier including upper and lower horizontally extending rails with vertically extending bars therebetween of a height to obstruct the passage of children between the sections of the vehicle, one end of each rail being adjacent one bracket and the other end of each rail being adjacent the other bracket, eye bolts threaded into each end of said upper rail with the eyes thereof embracing said intermediate portions of said brackets and slidable thereon, a sleeve and cooperating nut on each of said eye bolts whereby said eye bolts may clamp against their cooperating brackets, hook bolts threaded into the ends of said lower rail, a sleeve and cooperating nut on each hook bolt whereby said hook bolts can be selectively clamped or released from said intermediate portions of said brackets, so the bottom rail of the barrier can be disconnected from the brackets by release of the hook bolts, and keepers for mounting in the upper portion of the vehicle and the lower portion of the vehicle for cooperation with said hook bolts, and the hook bolts can be secured to the keepers at the upper portion of the vehicle or to the keepers at the relatively lower portion of the vehicle, respectively.

References Cited in the file of this patent

UNITED STATES PATENTS

| | | |
|---|---|---|
| 1,268,773 | Shettler | June 4, 1918 |
| 1,673,798 | Carlson | June 19, 1928 |
| 1,901,329 | Phillips | Mar. 14, 1933 |
| 2,530,266 | Quackenbush | Nov. 14, 1950 |
| 2,599,663 | Schutzer | June 10, 1952 |
| 2,749,143 | Chika | June 5, 1956 |
| 2,864,648 | Bland | Dec. 16, 1958 |
| 2,865,670 | Dunn | Dec. 23, 1958 |
| 2,884,279 | Halstead | Apr. 28, 1959 |
| 2,892,495 | Hadden | June 30, 1959 |

FOREIGN PATENTS

| | | |
|---|---|---|
| 1,145,272 | France | May 6, 1957 |
| 24,892 | Great Britain | of 1913 |